(12) United States Patent
Wada

(10) Patent No.: US 6,404,939 B1
(45) Date of Patent: Jun. 11, 2002

(54) IMAGE READING APPARATUS

(75) Inventor: Shigeru Wada, Kishiwada (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/241,404

(22) Filed: Feb. 2, 1999

(30) Foreign Application Priority Data

Feb. 4, 1998 (JP) .......................................... 10-022905

(51) Int. Cl.$^7$ ................................................ G06K 7/00
(52) U.S. Cl. ....................... 382/312; 382/312; 348/335; 348/357; 359/676; 359/704; 396/72; 396/77
(58) Field of Search ..................... 382/312; 355/53–55; 347/241; 359/204–205, 212, 234, 683–684, 686, 690, 692, 696, 704, 708, 740, 745–747, 755–757; 358/474–475, 487; 348/347, 358

(56) References Cited

U.S. PATENT DOCUMENTS

| | | | | |
|---|---|---|---|---|
| 5,235,349 A | * | 8/1993 | Yamazaki ................... | 347/241 |
| 5,243,468 A | * | 9/1993 | Ohtake ....................... | 359/740 |
| 5,398,064 A | * | 3/1995 | Saka .......................... | 348/347 |
| 5,424,869 A | * | 6/1995 | Nanjo ......................... | 359/387 |
| 5,610,769 A | * | 3/1997 | Shoji .......................... | 359/745 |
| 5,675,439 A | * | 10/1997 | Nakatsuji .................... | 359/684 |
| 5,731,910 A | * | 3/1998 | Baumann .................... | 359/689 |
| 5,838,479 A | * | 11/1998 | Shiraishi ..................... | 359/204 |
| 5,933,186 A | * | 8/1999 | Ikari et al. ................... | 348/97 |
| 5,940,223 A | * | 8/1999 | Yoshida et al. ............. | 359/699 |
| 5,953,106 A | * | 9/1999 | Unno et al. ................. | 355/55 |
| 5,956,187 A | * | 9/1999 | Shintani ...................... | 359/696 |
| 5,986,743 A | * | 11/1999 | Hanzawa .................... | 355/53 |
| 6,002,529 A | * | 12/1999 | Kohno et al. ............... | 359/686 |
| 6,111,666 A | * | 8/2000 | Yoshinaga .................. | 358/474 |

FOREIGN PATENT DOCUMENTS

| JP | 06062309 | 3/1994 |
|---|---|---|
| JP | 08160276 | 6/1996 |

* cited by examiner

Primary Examiner—Jose L. Couso
Assistant Examiner—Gregory Desire
(74) Attorney, Agent, or Firm—Burns, Doane, Swecker & Mathis, LLP

(57) ABSTRACT

Four lenses having a common optical axis are provided in a lens barrel 17 composing an image-forming optical system. The four lenses are termed G1, G2, G3, and G4 from the light source side first and have positive, negative, positive, and positive components, respectively. The lenses G1 and G2 have high error sensitivities, while the lenses G3 and G4 have relatively low error sensitivities. The lenses G1, G2, and G3 are held by a first lens barrel made of metal having a low thermal expansion coefficient, while the lens G4 is held by a second lens barrel made of resin having a high thermal expansion coefficient. On the other hand, an image pickup element is held by a third lens barrel made of metal having a low thermal expansion coefficient. The first lens barrel is adhered to and held by the second lens barrel, while the third lens barrel is joined to and held by the second lens barrel. Each of the first and third lens barrels is attached to the second lens barrel.

15 Claims, 6 Drawing Sheets

IMAGE READING APPARATUS

This application is based on application No. Hei 10-22905 filed in Japan, the content of which is hereby incorporated by reference.

BACKGROUND OF THE INVENTION

1. Field of the Invention

The present invention relates to image reading apparatus and, more particularly, to an image reading apparatus for reading an image from a developed film.

2. Description of the Prior Art

To read an image from a developed film by using an image reading apparatus compatible with, e.g., an advanced photo system (APS), there has conventionally been performed the process of drawing the film out of a cartridge by means of a winding member, converting the image recorded thereon to an electric image signal via an image pickup element such as a CCD, and reproducing the image on a display or the like.

Such a conventional image reading apparatus has used generally a CCD line sensor as an image pickup element to read an image by scanning a film, which is effective in obtaining an image with high resolution. However, an excessively long time is required by the conventional image reading apparatus to read an image because of the film scanning time is required. If a CCD area sensor is used instead as the image pickup element, an image can be read momentarily.

In order for the image reading apparatus using the area sensor to achieve high resolution comparable to that achieved by a system using the line sensor for scanning the film, the number of CCD pixels should be increased significantly. To accomplish this, there can be used a method in which the number of pixels per unit area is increased or a method in which the CCD size is increased. Normally, there is used the method in which the number of pixels per unit area is increased. In accordance with the method, however, an acceptable error range of back focus required is reduced in an image-forming optical system in the image reading apparatus since the optical system is generally composed of a lens combination for reducing image size.

In the case where a single lens barrel holds an optical system composed of lenses having positive, negative, positive, and positive refractive powers which are arranged in this order for image size reduction, a variation in back focus caused by temperature becomes unidirectional. In other words, an elongated distance between each adjacent two of the lenses and an elongated distance between any of the lenses and the CCD cooperate to move a focal point in one direction, so that it is impossible to perform temperature compensation. This causes the problem that a variation in back focus caused by temperature cannot be compensated by a depth of focus.

For temperature compensation in an optical system, there has been devised a conventional structure in which a lens barrel for holding is divided into three members to cause the extension of the middle member to occur in the direction opposite to the extension of two other members, as disclosed in Japanese Unexamined Patent Publication No. Hei 8-160276.

If the above mentioned image-forming optical system is applied to such conventional structure for temperature compensation, what results is a structure in which all lenses are held by a first lens barrel having a low thermal expansion coefficient, the end portion of the first lens barrel closer to the CCD is held by a second (middle) lens barrel having a high thermal expansion coefficient, and the end portion of the second lens barrel closer to the front end of the lenses is held by the third lens barrel having a low thermal expansion coefficient.

In this case, the middle lens barrel covers the first lens barrel holding all the lenses so that the diameter of the middle lens barrel is increased in proportion to a maximum lens diameter, which limits the scaling down of the apparatus. Further scaling down can be achieved if the apparatus is similarly constituted by regarding the CCD as a lens. In that case, however, temperature compensation is not performed properly since the CCD itself is a heating element and has a temperature different from the ambient temperature of the lens.

SUMMARY OF THE INVENTION

It is therefore an object of the present invention to overcome the foregoing problems and provide an image reading apparatus which allows correction of a back focal shift caused by thermal deformation in the image-forming optical system.

To attain the object, one aspect of the present invention is embodied in an image reading apparatus comprising: an illuminator for illuminating an original image on a film; an image-forming optical system for forming an image from the original image illuminated by the illuminator; and an image pickup element for converting the image formed by the image-forming optical system into an electric image signal, the image-forming optical system being an optical system for image size reduction composed of an anterior group having a high error sensitivity and a posterior group having a low error sensitivity when viewed from the illuminator side, the anterior group being held by a first lens barrel composed of a material having a low thermal expansion coefficient, the posterior group being held by a second lens barrel composed of a material having a high thermal expansion coefficient, the image pickup element being held by a third lens barrel composed of a material having a low thermal expansion coefficient, the first and third lens barrels being held by the second lens barrel.

The optical system is composed of four lenses having positive, negative, positive, and positive refractive powers, respectively. If the four lenses are designated at G1, G2, G3, and G4, respectively, the anterior group is composed of the lenses G1 to G3 and the posterior group is composed of the lens G4. Alternatively, the anterior group is composed of the lenses G1 and G2 and the posterior group is composed of the lenses G3 and G4.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
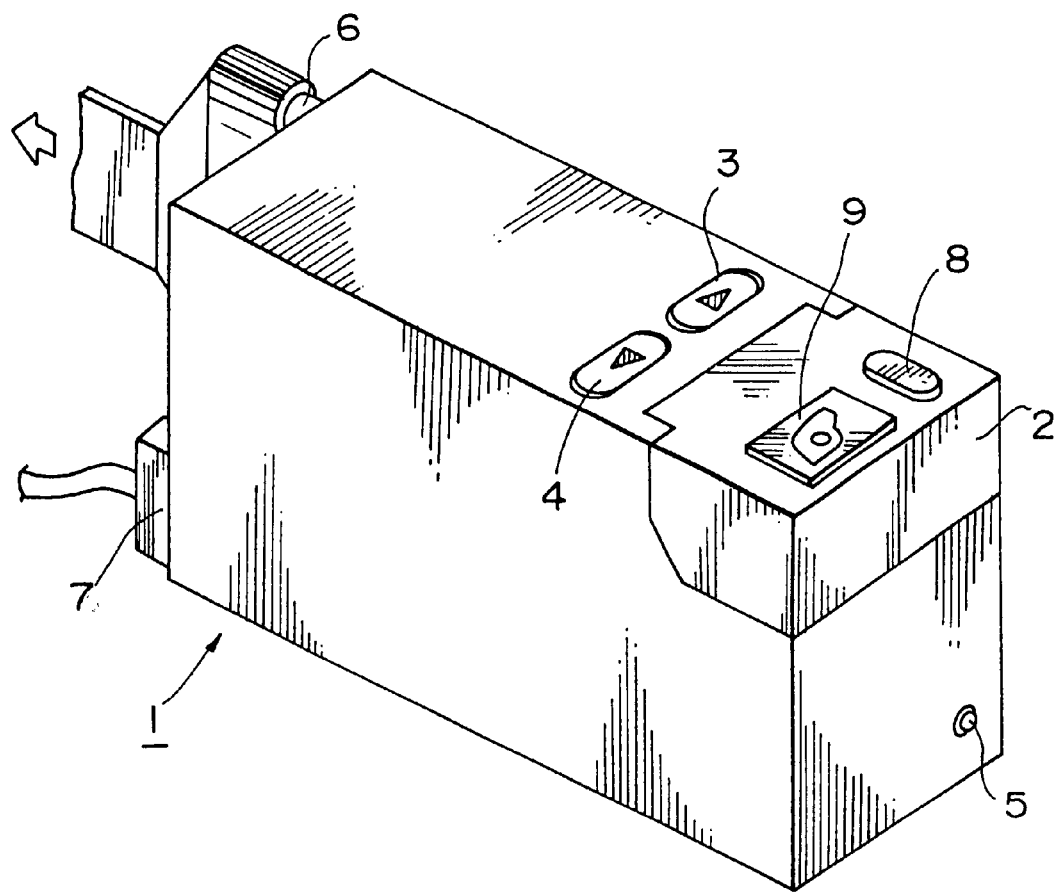
FIG. 1 is a perspective view showing an outward layout of an embodiment according to the present invention.

The embodiments of the present invention will be described with reference to the drawings. FIG. 1 is a perspective view showing an outward layout of an image reading apparatus. As shown in the drawing, the image reading apparatus 1 is outwardly configured as a rectangular parallelepiped. In the apparatus, a cartridge chamber lid 2, a frame advancing button 3, and a frame backing button 4 are disposed on the right side of the top face when viewed from the front side face orthogonal to the direction of thickness. An LED 5 for display is disposed on the right side face, while a connector 6 and an AC connector 7 are disposed on the left side face to be connected to a computer for image processing and a power source, respectively, each of which is not shown. A power button 8 and a cartridge eject button 9 are disposed on the top face of the cartridge chamber lid 2.

Figure 2:
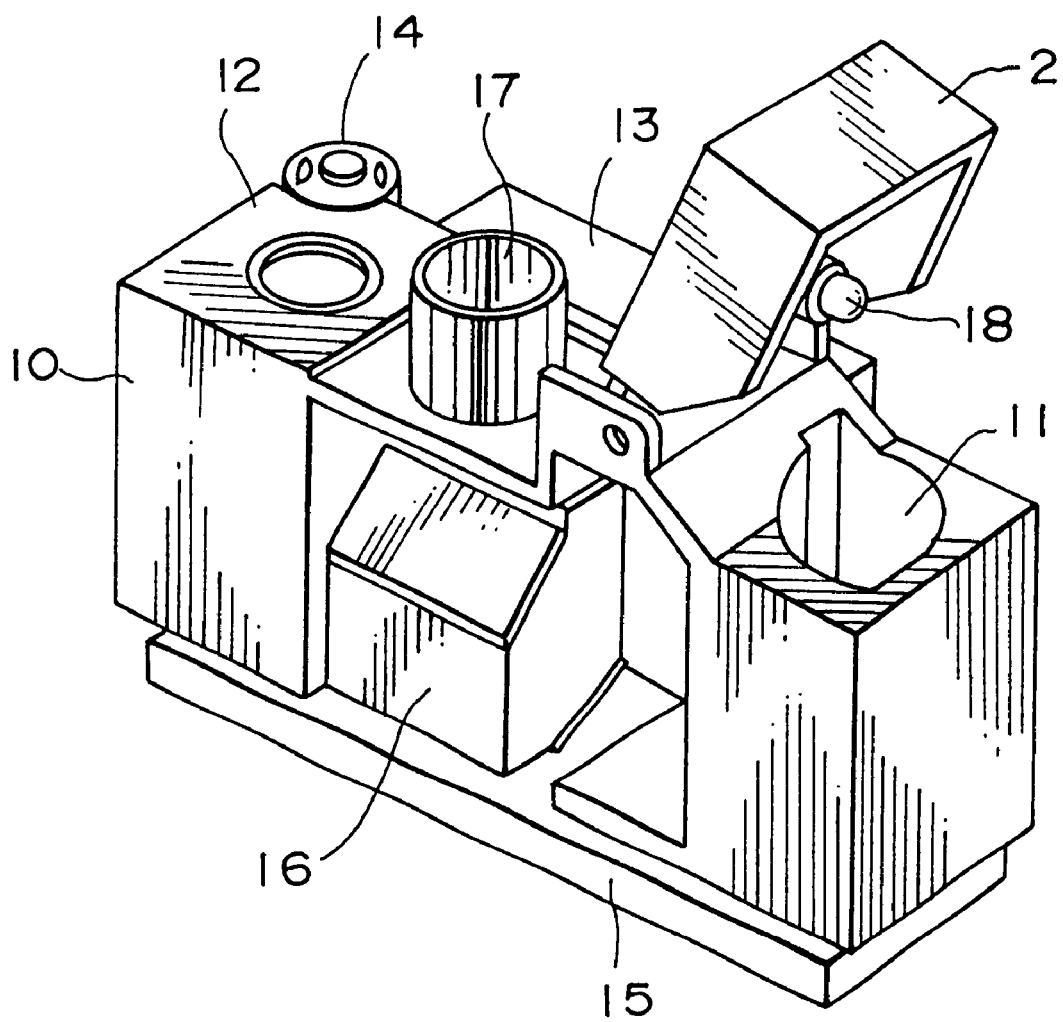
FIG. 2 is a view showing an internal system arrangement in an image reading apparatus according to the embodiment.

FIG. 2 is a view showing an internal system arrangement in the image reading apparatus 1. As shown in the drawing, a cartridge chamber 11 is disposed on the right side when viewed from the front side, while a spool chamber 12 is disposed in a body 10 on the left side. An image-forming optical system and the like are disposed in a region interposed between the two chambers. A light source unit 13 for emitting light transmitted by a film is disposed on the back side, while a film transport motor 14 is disposed posterior to the spool chamber 12. A film transport unit 15 is disposed under the body 10 to extend over the cartridge chamber 11 and the spool chamber 12. A reference numeral 18 denotes a cartridge spool presser, which will be described later.

The image-forming optical system is composed of a mirror box 16 and a lens barrel 17, each of which has been attached to the body 10. Of the two components, the mirror box 16 is located in the vicinity of the center of the apparatus and accommodated in the body 10. The lens barrel 17 is positioned above the mirror box 16 and attached to a rib of the body 10 connecting the cartridge chamber 1 to the spool chamber 12. The upper end of the lens barrel 17 is positioned slightly lower in level than the top face of the cartridge chamber lid 2 when the cartridge chamber is closed.

Figure 3:
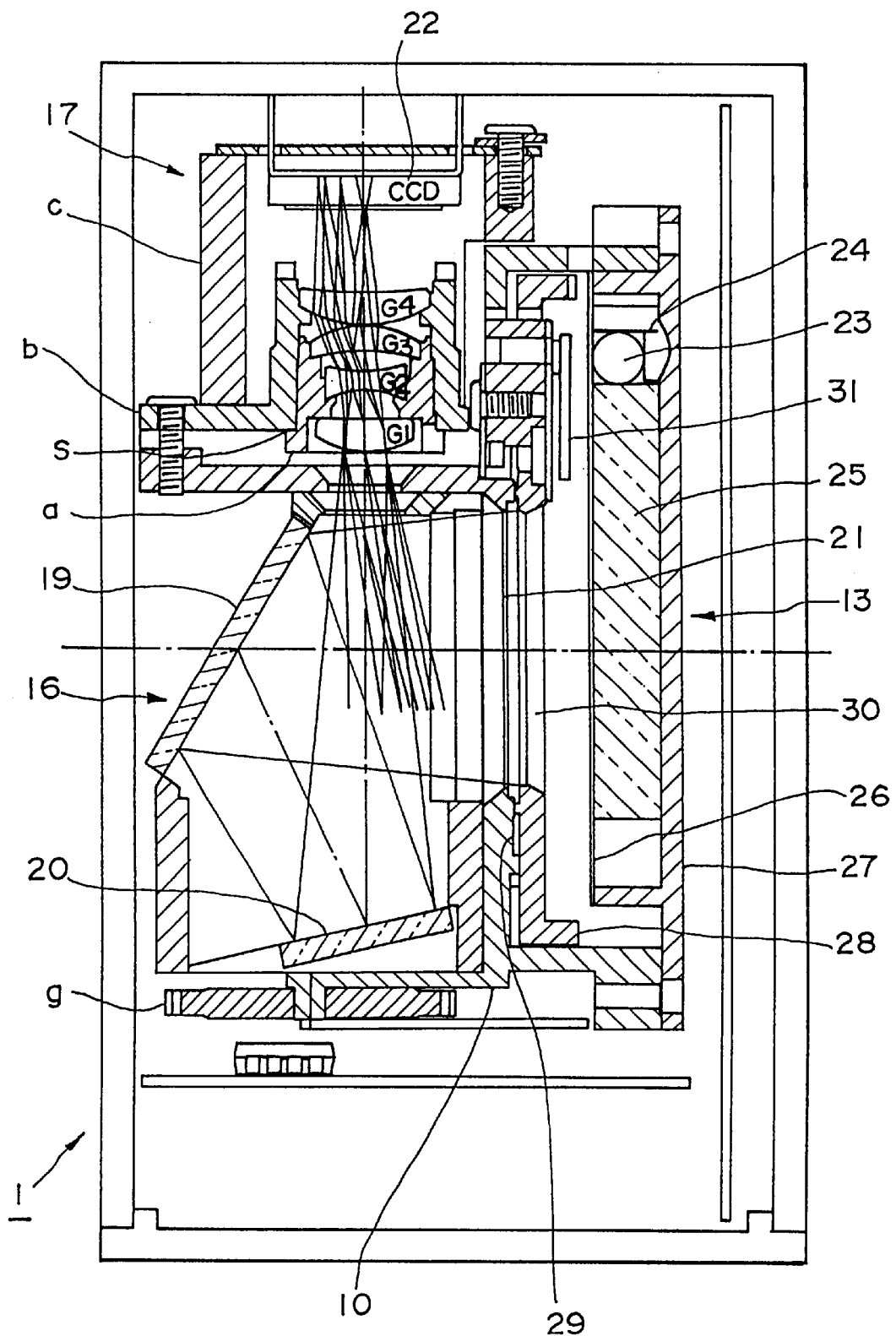
FIG. 3 is a view showing an internal structure of the image reading apparatus according to the embodiment when viewed from the right side face thereof.

FIG. 3 is a view showing an internal structure of the image reading apparatus 1 when viewed from the right side face thereof. As described above, the image-forming optical system is composed of the mirror box 16 and the lens barrel 17, each of which has been attached to the body 10. As shown in the drawing, the mirror box 16 includes two mirrors, of which the first mirror 19 tilts downward to a certain extent in opposing relation to an aperture 21 opened in the body 10 for allowing light passing therethrough from the light source unit 13 toward the film and the image-forming optical system. The first mirror 19 downwardly reflect the light transmitted through the film. The second mirror 20 is positioned in the lower part of the mirror box 16 to upwardly reflect the reflected light from the first mirror 19 and guide it toward the lens barrel 17. A film transport gear "g" of the film transport unit 15 and the like are disposed under the mirror box 16.

A lens unit provided in the lens barrel 17 forms an image from the reflected light on an image pickup element 22 fastened to the upper end of the lens barrel 17. The lens unit is composed of four lenses having a common optical axis. The four lenses are termed G1, G2, G3, and G4 from the light source side first and have positive, negative, positive, and positive refracting powers, respectively. In the optical system, the lenses G1 and G2 have high error sensitivities, while the lenses G3 and G4 have relatively low error sensitivities. The error sensitivity is defined here as the degree to which defocus occurs relative to a positional error.

Therefore, the lenses G1, G2, and G3 are held by a first lens barrel "a" made of metal having a low thermal expansion coefficient, while the lens G4 is held by a second lens barrel "b" made of resin having high thermal expansion coefficient. It is to be noted that the lens G3 may be held either of the first and second lens barrels "a" and "b". On the other hand, the image pickup element 22 is held by a third lens barrel "c" made of metal having a low thermal expansion coefficient. The lens barrel 17 is constituted by the lens barrels "a", "b", and "c".

The first lens barrel "a" has a flange on the lower end thereof. The lower end face of the second lens barrel "b" has been adhered to an adhesion face "s" forming the top face of the flange and vertical to the optical axis. The first lens barrel "a" is free to expand and contract when it is fitted in the inner circumferential face of the second lens barrel "b". The first lens barrel "a" has a structure in which the optical axis of the lenses is not deviated by the expansion and contraction. The second lens barrel "b" has a rib extending radially from the lower end thereof. The lower end face of the third lens barrel "c" has been joined to the rib. The position of junction between the first and second lens barrels "a" and "b" substantially coincides with the position of junction between the third and second lens barrels "c" and "b" relative to the direction of the optical axis.

Thus, the lens barrels "a" to "c" integrally constitute the lens barrel 17 and are screwed to the body 10 via the rib of the second lens barrel "b". Back focus adjustment for the optical system can be performed by adjusting the distance between the body 10 and the lens barrel 17. For this purpose, there may be used a method in which a washer is interposed between the body 10 and the lens barrel 17 or a method in which adjustment is performed by means of a screw.

Although the lenses G1 to G4 are composed of glass lenses to decrease thermal expansion of the lenses in this embodiment, plastic lenses may also be used. Although the present embodiment has used the four lenses which have positive, negative, positive, and positive refracting powers, three lenses which have positive, negative, and positive refracting powers may also be used to compose an optical system having similar performance. In that case, the positive and negative lenses in an anterior group are held by the first lens barrel "a", while the positive lenses in a posterior group is held by the second lens barrel "b".

The light source unit 13 shown in the drawing is in opposing relation to the aperture 21 and has a light source 23 composed of a xenon (Xe) tube, a trigger spring 24 for applying a voltage to the light source 23, a light guiding plate 25 for guiding light from the light source, a diffusing sheet for diffusing light from the light guiding plate 25, and a holder composed of a nonconductive member. The light source unit 13 will be described later in greater detail.

A pressure plate 28 is disposed between the aperture 21 in the body 10 and the light source unit 13. On the pressure plate 28, there are provided a magnetic data reading/writing members, perforation detecting members, an optical format data reading members, and a film pressing roller, each of which will be described later. The pressure plate 28 is screwed to the body 10. A film passage 29 is formed between the pressure plate 28 and the body 10, similarly to a typical camera.

A hole 30 slightly larger than the aperture 21 in the body 10 is formed in the center of the pressure plate 28 such that light from the light source unit 13 reaches the film. The hole 30 is provided with respective tapers located on the film side and on the light source side to prevent the tip of the film from falling therein during a thrust operation (during film transportation) and prevent screen brightness from varying due to the reflection of diffused light by an edge. The pressure plate 28 is also formed with respective holes for the magnetic data reading/writing members, the perforation detecting members, and the format data reading members, each of which is not shown and is provided with tapers. A head unit 31 into which the magnetic data reading/writing member has been incorporated is provided above the pressure plate 28.

Although, in the present embodiment, a CCD area sensor is used as the image pickup element to provide a structure which obviates the necessity for scanning the film. The structure is also effective in providing an image with high resolution. However, the image pickup element is not limited to the structure. It is also possible to use a CCD line sensor as the image pickup element to provide a structure optionally including a scan driving system.

Figure 4:
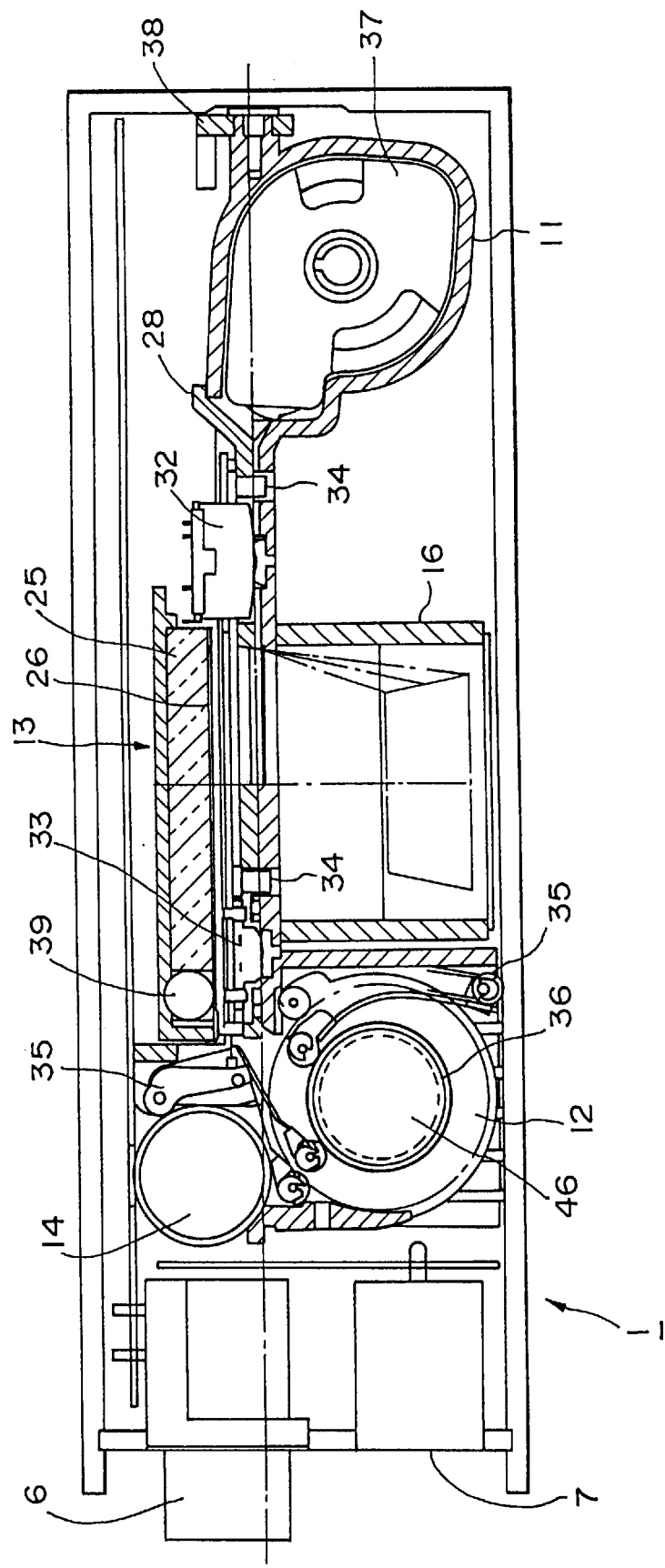
FIG. 4 is a view showing an internal structure of the image reading apparatus according to the embodiment when viewed from the top face thereof.

FIG. 4 is a view showing an internal structure of the image reading apparatus 1 when viewed from the top face thereof. As shown in the drawing, the magnetic data reading/writing members include a reading head 32 (closer to the cartridge side), a writing head 33 (closer to the spool side), and two edge follow pins 34 disposed in the vicinity of the respective magnetic heads, which are provided on a single base plate to read and write magnetic data from and to a film surface. The magnetic data reading/writing members are disposed proximate the one of the side edges of the film closer to the lens barrel 17. The two edge follow pins 34 detect the edges of the film and uses the detected edges as a reference for the a image of each of the magnetic heads. The base plate is biased with springs (not shown) both in the direction in which the edge follow pins 34 come into contact with the film and in the direction in which each of the magnetic heads comes into contact with the film surface.

The perforation detecting members for detecting a sequence of perforations formed in the film include two photo reflectors (not shown) which are symmetrically positioned relative to the aperture 21 interposed therebetween proximate the side edge of the film closer to the film transport unit 15. The optical format data reading members include an LED and a photodiode (not shown) which are disposed between the reading head 32 and the writing head 33 in opposing relation to each other with the film interposed therebetween. The film pressing roller 35 is for guiding the leading edge of the film to the spool 36 as the winding member during the thrust operation and disposed on the side of the pressure plate 28 closer to the spool.

Reference numerals 37 and 38 on the right side of FIG. 4 denote a film cartridge loaded in the cartridge chamber 11 and a locking member for the cartridge chamber lid 2, respectively. In addition to the light guiding plate 25, the diffusing sheet 26, and the holder 27, the drawing also shows a trigger transformer 39 provided in the light source unit 13 to apply a discharge voltage (trigger voltage) to the Xe tube, which will be described later.

The film transport member is composed of a transport motor 14 as a driving source and a deceleration system therefor, a planet clutch for selectively transmitting a driving force to the spool 36, a film rewinding driver for rewinding a film, and a controller for the foregoing components, most of which are accommodated in the film transport unit 15. A detailed description of the components is omitted here since they are irrelevant to the essential feature.

Figure 5:
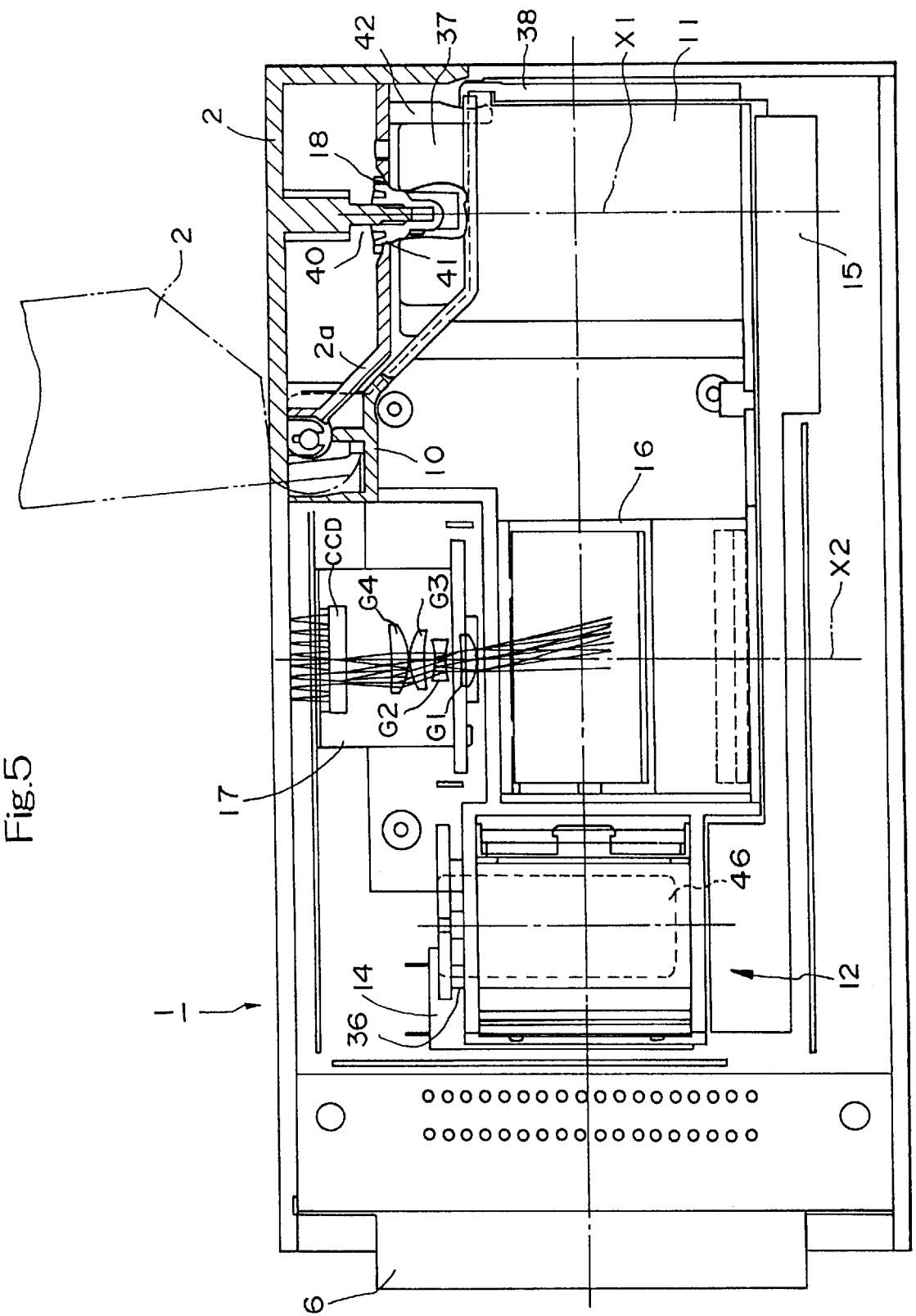
FIG. 5 is a view showing an internal structure of the image reading apparatus according the embodiment when viewed from the front side thereof.

FIG. 5 is a view showing an internal structure of the image reading apparatus 1 when viewed from the front side thereof. As shown in the drawing, the cartridge chamber lid 2 is positioned in the upper part of the cartridge chamber 11 and rotatably pivoted by the body 10. The open state reached as a result of rotation is indicated by the two-dot-dash line. The cartridge chamber lid 2 is provided with the cartridge spool presser 18, a spring 40 for axially biasing the cartridge spool presser 18, a member for reading data indicative of "developed state", and an inner lid 2a for supporting the foregoing members. As shown in FIG. 1, the power button 8 and the cartridge eject button 9 are further provided on the top face of the cartridge chamber lid 2. As indicated by the dash-dot lines in FIG. 5, the cartridge spool axis X1 and the optical axis X2 of the image-forming optical system are arranged approximately parallel to each other. As shown in the drawings, the spool 36 and the optical axis X2 of the image-forming optical system are also arranged approximately parallel to each other so that the optical axis X2 is approximately parallel to the plane of the film drawn out from the film cartridge 37.

The data indicative of "developed state" is recorded on a region of the end face of the film cartridge at the greatest distance from a film outlet. The presence or absence of a given plastic piece indicates whether or not development has been performed. The inner lid 2a is formed integrally with a rotation axis hole 41 and with a lock click 42. As indicated by the broken lines in FIGS. 4 and 5, the provision of a capacitor 46 in the spool 36 allows effective use of space and provides an energy source for the light source. It is to be noted that the positions of the capacitor 46 and the transport motor 14 may be interchanged.

Figure 6:
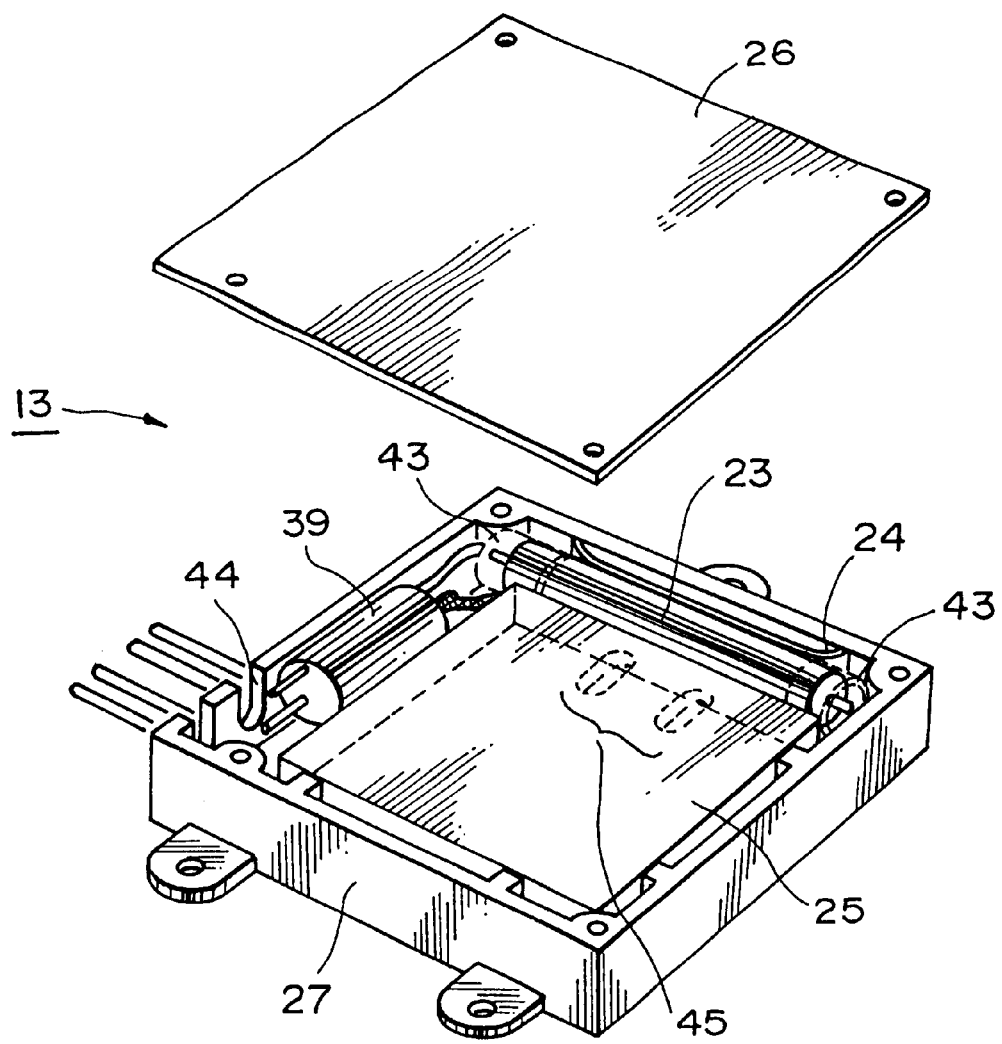
FIG. 6 is a perspective view showing a structure of a light source unit according to the embodiment.

FIG. 6 is a perspective view showing a structure of the light source unit 13. As shown in the drawing, the light guiding plate 25 for introducing light from the light source from the side face and emitting it from an illuminating face is disposed in the holder 27 as the nonconductive member. There are also disposed the light source 23 composed of the Xe tube in opposing relation to the side face of the light guiding plate 25 serving as a light receiving face and the trigger transformer 39 on a side face contiguous thereto. Each of the light source 23 and the trigger trans 39 has been sized substantially smaller than the thickness of the light guiding plate 25. The light source 23 has terminals on both ends thereof covered with a silicon tube 43 so that the trigger transformer 39 at a high voltage does not release a voltage thereto. The light source 23 has a near-center portion thereof pressed against the light guiding plate 25 by the trigger spring 24 for applying the voltage from the trigger transformer 39 to the Xe tube.

The trigger spring 24 is made of a stainless material having a high light reflectance and efficiently guides light from the light source 23 to the light guiding plate 25. The trigger spring 24 is connected to an output of the trigger transformer 39 via a lead wire. The light guiding plate 25 has the face for receiving light from the light source 23, a reflecting face coated with a reflecting sheet opposite to the light receiving face, the illuminating face for illumining the film (upper face in the drawing), and the diffusing face (lower face in the drawing) opposite to the illuminating face, which has been subjected to a diffusing treatment.

Basically, the holder 27 is closed at the five faces other than the face corresponding to the illuminating face of the light guiding plate 25 and thereby prevents undesired light leakage and voltage release from the trigger transformer 39. The five faces are formed with a hole 44 for the lead wire connected to the terminal of the Xe tube composing the light source 23 and to the trigger terminal and with a heat dissipation hole 45 for radiating heat generated from the Xe tube and its surroundings. These holes are formed in regions which are out of reach of the voltage released from the trigger transformer 39. The diffusing sheet 26 is made of a nonconductive member and attached to the holder 27 in such a manner as to cover the entire illuminating face thereof and thereby prevents voltage release from the trigger transformer 39, similarly to the holder 27. The heat dissipation hole may also be formed in a region of the diffusing sheet 26 provided that the region is out of reach of the released voltage.

A description will be given to a specific operation in the case of using the image reading apparatus according to the present embodiment. As shown in FIG. 5, the film cartridge 37 is placed in the cartridge chamber 11. On closing the cartridge chamber lid 2, the lock click 42 of the inner lid 2a actuates the locking member 38 on standby such that the cartridge chamber lid is held thereby in engaged relation. In this state, the cartridge spool is pivoted rotatably by the cartridge spool presser 18 and by the rewinding driver (not shown) on the bottom portion of the cartridge chamber 11.

If the locking of the cartridge chamber lid 2 is detected, driving mechanism (not shown) rotates a light lock door (not shown) of the cartridge 37 such that it shifts from the closed state to the open state. Subsequently, the driving force is transmitted to the rewinding driver by controlling the planet clutch and thereby interrupt power transmission to the spool 36. The rewinding driver then drives the cartridge spool and the condition of a barcode disk formed integrally therewith is read by a barcode reading member (not shown). Thereafter, the planet clutch is controlled so that the rewinding driver and the spool 36 rotate in the same direction in which the cartridge spool thrusts the film.

As a result, the film is thrusted out of the cartridge 37 from the film outlet. The film thrusted out of the cartridge 37 passes through the film passage 29 defined by the body 10 and the pressure plate 28 (see FIG. 3). The leading edge of the film passed through the passage 29 is guided by the film pressing roller 35 in the spool chamber 12 and wound around the spool 36 (see FIG. 4). When the leading edge of the film has been wound on the spool 36, transmission of driving power to the rewinding driver is interrupted. Thereafter the winding of the film is continued only by the force of the spool 36 and stopped when a first frame is detected.

From this condition, the film is wound around the spool 36 by one frame every time the frame advancing button 3 is pushed. On the other hand, the film is rewound from the spool 36 by one frame every time the frame backing button is pushed. At this time, each driving member is in a driving state compliant with the content of an instruction given via the corresponding button. While the film is moving during the winding or rewinding operation, magnetic data on the film is read by the reading head 32.

When the film stops, a voltage is placed on the trigger transformer 39 of the light source unit 13 to cause the Xe tube of the light source 23 to emit light. The light emitted from the Xe tube enters from the side face of the light guiding plate 25, is irregularly reflected by the diffusing face, and exits from the illuminating face. The light is then more uniformly diffused by the diffusing sheet 26. As shown in FIG. 3, the light transmitted by the diffusing sheet 26 passes through the film, is downwardly reflected by the first mirror 19 in the mirror box 16, and then upwardly reflected by the second mirror 20 in the same mirror box 16 parallel to the film. From the light obtained, the optical system in the lens barrel 17 forms an image on the image pickup element 22.

The image data obtained by the image pickup element 22 and the magnetic data is transmitted from the connector 6 to the computer for image processing (not shown) to be displayed and/or processed. Since the image pickup element 22 develops heat when it is energized, the temperature in the apparatus increases with the passage of time. The temperature increase elongates the distance between each adjacent two of the lenses G1 to G3 held by the first lens barrel "a" as well as the distance between the point to which the third lens barrel "c" is attached and the image pickup element 22 held by the third lens barrel "c". Consequently, the focal point moves forward relative to the image pickup element 2. In particular, the elongated distance between the lenses G1 and G2 having high error sensitivities is a major factor responsible for the movement of the focal point. However, the focal point is prevented from shifting greatly since the lens G4 held by the second lens barrel "b" approaches the surface of the image pickup element 22 to cancel out the elongation of the distance.

After the completion of image reading, the cartridge eject button 9 provided in the cartridge chamber lid 2 is pushed to transmit the driving force to the rewinding driver. At this time, the planet clutch is controlled to interrupt power transmission to the spool 36. As a result, the rewinding driver drives the cartridge spool so that the film is rewound into the cartridge 37. After the film is completely accommodated in the cartridge 37, the barcode reader detects the rotational position of the barcode disk formed integrally with the cartridge spool, based on which the rewinding driver stops the cartridge spool at a specified point.

Subsequently, the driving mechanism rotates the light lock door of the cartridge 37 such that it shifts from the open state to the closed state. Finally, the locking member 38 in the engaged state shifts to the standby state to unlock the cartridge chamber lid 2. The unlocked cartridge chamber lid 2 is slightly lifted by the spring 40 pressing one end of the cartridge spool. This allows the user to raise the cartridge chamber lid 2 and retrieve the cartridge 37 by grasping the exposed portion thereof.

Although the image data obtained by the image pickup element is transmitted to the computer for image processing and display in the foregoing embodiment, the present invention is also applicable to an apparatus in which a display unit and a processing circuit are incorporated in the image reading apparatus 1. The present invention is also applicable to an apparatus having an output device such as a printer.

Although the foregoing embodiment has transported a roll film accommodated in a cartridge to a place at which the roll film is wound up and illuminated, the present invention is not limited thereto. It is also possible to move a holder for holding, instead of the roll film, a strip film or frames of slide film. Alternatively, the present invention also applicable to an apparatus in which an original image is manually set at the illumination place.

With the above described arrangement, there can be obtained an image reading apparatus which allows correction of a back focal shift caused by thermal deformation in the image-forming optical system. Specifically, the back focal shift caused by thermal deformation can be corrected since the back focal shift due to the lens group having a high error sensitivity is suppressed by a low-expansion material and, moreover, the amount of movement of the lens group having a low error sensitivity is smaller than the amount of movement of the CCD. Furthermore, back focus adjustment can be performed by a simpler operation since the individual components have been integrated into one unit.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reading apparatus comprising:
   an illuminator which illuminates an original image on a film;
   an image-forming optical system which forms an image from the original image illuminated by said illuminator; and
   an image pickup element which converts the image formed by said image-forming optical system into an electric image signal;
   wherein said image-forming optical system being an optical system for image size reduction composed of an anterior group in which at least one element thereof having a high error sensitivity and a posterior group having a low error sensitivity when viewed from the illuminator side, the anterior group being held by a first lens barrel composed of a material having a low thermal expansion coefficient, the posterior group being held by a second lens barrel composed of a material having a high thermal expansion coefficient, the image pickup element being held by a third lens barrel composed of a material having a low thermal expansion coefficient, and the first and third lens barrels being held by the second lens barrel.

2. An image reading apparatus according to claim 1, wherein said optical system is composed of first to fourth lens units having positive, negative, positive, and positive refractive powers, respectively.

3. An image reading apparatus according to claim 2, wherein the anterior group is composed of the first to third lens units and the posterior group is composed of the fourth lens unit.

4. An image reading apparatus according to claim 2, wherein the anterior group is composed of the first and second lens units and the posterior group is composed of the third and fourth lens units.

5. An image reading apparatus according to claim 1, wherein said image pick up element is a two dimensional area sensor.

6. An image reading apparatus according to claim 1 further comprising a film winding mechanism which draws out the film from a film cartridge loaded in said image reading apparatus so as to move the original image toward a position confronting said illuminator.

7. An image reading apparatus according to claim 1, wherein said first and third lens barrels are made of metal and said second lens barrel is made of resins.

8. An image reading apparatus comprising:
   an illuminator which illuminates an original image on a film;
   an image-forming optical system which forms an image from the original image illuminated by said illuminator; and
   an image pickup element which converts the image formed by said image-forming optical system into an electric image signal;
   wherein said image-forming optical system being an optical system for image size reduction composed of first and second lens units having high error sensitivity and third and fourth lens units having low error sensitivity when viewed from the illuminator side, the first to third lens units being held by a first lens barrel composed of a material having a low thermal expansion coefficient, the fourth lens units being held by a second lens barrel composed of a material having a high thermal expansion coefficient, the image pickup element being held by a third lens barrel composed of a material having a low thermal expansion coefficient, and the first and third lens barrels being held by the second lens barrel.

9. An image reading apparatus according to claim 8, wherein said image pick up element is a two dimensional area sensor.

10. An image reading apparatus according to claim 8 further comprising a film winding mechanism which draws out the film from a film cartridge loaded in said image reading apparatus so as to move the original image toward a position confronting said illuminator.

11. An image reading apparatus according to claim 8, wherein said first and third lens barrels are made of metal and said second lens barrel is made of resins.

12. An image reading apparatus according to claim 8, wherein said first and third lens barrels are made of metal and said second lens barrel is made of resin.

13. An image reading apparats comprising:
    an illuminator which illuminates an original image on a film;
    an image-forming optical system which forms an image from the original image illuminated by said illuminator; and
    an image pickup element which converts the image formed by said image-forming optical system into an electric image signal;
    wherein said image-forming optical system being an optical system for image size reduction composed of an anterior group in which at least one element thereof having a first error sensitivity and a posterior group having a second error sensitivity when viewed from the illuminator side, the anterior group being held by a first lens barrel composed of a material having a first thermal expansion coefficient, the posterior group being held by a second lens barrel composed of a material having a second thermal expansion coefficient, the image pickup element being held by a third lens barrel composed of a material having a third thermal expansion coefficient, and the first and third lens barrels being held by the second lens barrel, wherein the first error sensitivity is higher than the second error sensitivity and the first thermal expansion coefficient and the third thermal expansion coefficient are lower than the second thermal expansion coefficient.

14. An image reading apparatus according to claim 13, wherein said first and third lens barrels are made of metal and said second lens barrel is made of resin.

15. An image reading apparatus comprising:
    an illuminator which illuminates an original image on a film;

an image-forming optical system which forms an image from the original image illuminated by said illuminator; and an image pickup element which converts the image formed by said image-forming optical system into an electric image signal;

wherein said image-forming optical system being an optical system for image size reduction composed of first and second lens units having a first error sensitivity and third and fourth lens units having a second error sensitivity when viewed from the illuminator side, the first to third lens units being held by a first lens barrel composed of a material having a first thermal expansion coefficient, the fourth lens unit being held by a second lens barrel composed of a material having a second thermal expansion coefficient, the image pickup element being held by a third lens barrel composed of a material having a third thermal expansion coefficient, and the first and third lens barrels being held by the second lens barrel;

wherein the first error sensitivity is higher than the second error sensitivity and the first thermal expansion coefficient and the third thermal expansion coefficient are lower than the second thermal expansion coefficient.

* * * * *